US010966584B2

(12) United States Patent
Thorne

(10) Patent No.: US 10,966,584 B2
(45) Date of Patent: Apr. 6, 2021

(54) LOW PROFILE SURFACE CLEANING HEAD

(71) Applicant: SHARKNINJA OPERATING LLC, Needham, MA (US)

(72) Inventor: Jason B. Thorne, Wellesley Hills, MA (US)

(73) Assignee: SharkNinja Operating LLC, Needham, MA (US)

( * ) Notice: Subject to any disclaimer, the term of this patent is extended or adjusted under 35 U.S.C. 154(b) by 406 days.

(21) Appl. No.: 15/750,653

(22) PCT Filed: Aug. 5, 2016

(86) PCT No.: PCT/US2016/045821
§ 371 (c)(1),
(2) Date: Feb. 6, 2018

(87) PCT Pub. No.: WO2017/024241
PCT Pub. Date: Feb. 9, 2017

(65) Prior Publication Data
US 2020/0085269 A1      Mar. 19, 2020

Related U.S. Application Data

(60) Provisional application No. 62/202,004, filed on Aug. 6, 2015.

(51) Int. Cl.
*A47L 9/16* (2006.01)
*A47L 5/30* (2006.01)
(Continued)

(52) U.S. Cl.
CPC .............. *A47L 9/1691* (2013.01); *A47L 5/30* (2013.01); *A47L 9/0411* (2013.01);
(Continued)

(58) Field of Classification Search
CPC ........ A47L 5/30; A47L 9/0411; A47L 9/1608; A47L 9/1641; A47L 9/1683;
(Continued)

(56) References Cited

U.S. PATENT DOCUMENTS

| 5,664,285 A | 9/1997 | Melito et al. |
| 5,765,258 A * | 6/1998 | Melito ............... A47L 5/30 |
| | | 15/352 |

(Continued)

FOREIGN PATENT DOCUMENTS

| WO | 0074548 A1 | 12/2000 |
| WO | WO-0074548 A1 * | 12/2000 ........... A47L 9/1683 |

OTHER PUBLICATIONS

PCT Search Report and Written Opinion dated Oct. 13, 2016, received in corresponding PCT Application No. PCT/US16/45821, 8 pgs.

(Continued)

*Primary Examiner* — Marc Carlson
(74) *Attorney, Agent, or Firm* — Grossman Tucker Perreault & Pfleger, PLLC

(57) ABSTRACT

A surface cleaning apparatus provides a lower profile surface cleaning head by moving at least the suction motor out of the surface cleaning head. The suction motor may be located in an upper portion (e.g., in a wand) pivotably coupled to the surface cleaning head and fluidly connected to a cyclone assembly located in the surface cleaning head. The cyclone assembly may include first and second opposing cyclones with smaller diameters (e.g., as compared to a single cyclone used in existing "all in the head" vacuums) to provide a lower profile with substantially the same or better performance.

20 Claims, 11 Drawing Sheets

(51) Int. Cl.
*A47L 9/04* (2006.01)
*B01D 45/16* (2006.01)
*B01D 50/00* (2006.01)
*B04C 5/28* (2006.01)
*B04C 9/00* (2006.01)

(52) U.S. Cl.
CPC ........... *A47L 9/1641* (2013.01); *A47L 9/1683* (2013.01); *B01D 45/16* (2013.01); *B01D 50/002* (2013.01); *B04C 5/28* (2013.01); *B04C 9/00* (2013.01); *B04C 2009/002* (2013.01)

(58) Field of Classification Search
CPC ...... A47L 9/1691; B01D 45/16; B01D 50/002; B04C 5/28; B04C 9/00; B04C 2009/002
See application file for complete search history.

(56) References Cited

U.S. PATENT DOCUMENTS

| | | | | |
|---|---|---|---|---|
| 6,442,792 | B1* | 9/2002 | Sudou | A47L 5/22 15/339 |
| 8,316,507 | B2* | 11/2012 | Hyun | A47L 9/108 15/327.1 |
| 9,295,363 | B1* | 3/2016 | Conrad | A47L 9/16 |
| 9,801,515 | B2* | 10/2017 | Kim | A47L 9/1616 |
| 10,130,227 | B2* | 11/2018 | Kim | A47L 9/165 |
| 10,357,136 | B2* | 7/2019 | Conrad | A47L 9/325 |
| 2002/0059689 | A1 | 5/2002 | Kato et al. | |
| 2004/0088820 | A1* | 5/2004 | Kato | A47L 9/2857 15/351 |
| 2006/0107630 | A1* | 5/2006 | Ivarsson | A47L 9/1608 55/345 |
| 2006/0196004 | A1* | 9/2006 | Conrad | A47L 5/30 15/352 |
| 2009/0056060 | A1* | 3/2009 | Han | A47L 5/12 15/349 |
| 2010/0224073 | A1 | 9/2010 | Oh et al. | |
| 2012/0167336 | A1 | 7/2012 | Tran et al. | |
| 2013/0291333 | A1* | 11/2013 | Grey | A47L 9/325 15/347 |
| 2014/0237758 | A1 | 8/2014 | Conrad | |

OTHER PUBLICATIONS

Chinese Office Action with translation dated Mar. 13, 2020, received in Chinese Patent Application No. 201680058810.X, 14 pgs.

* cited by examiner

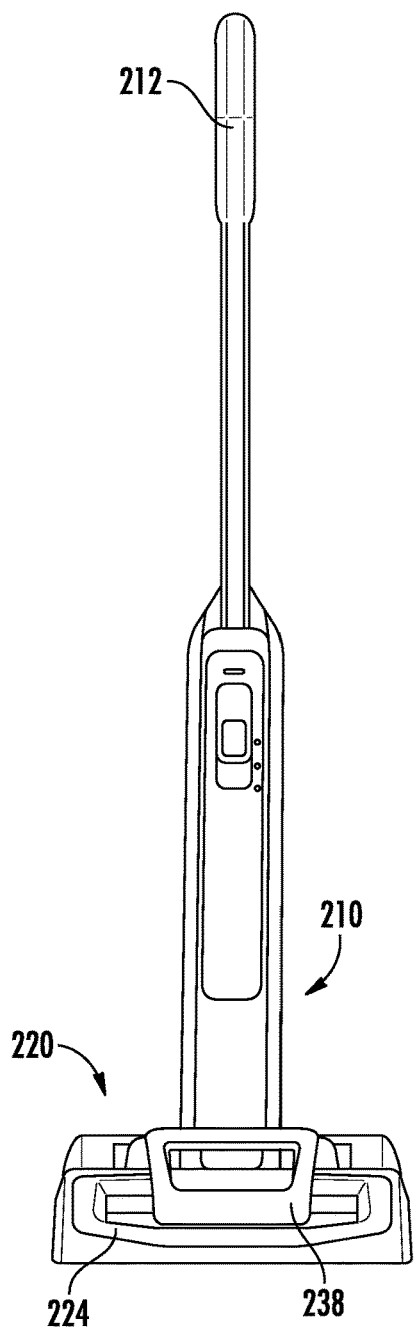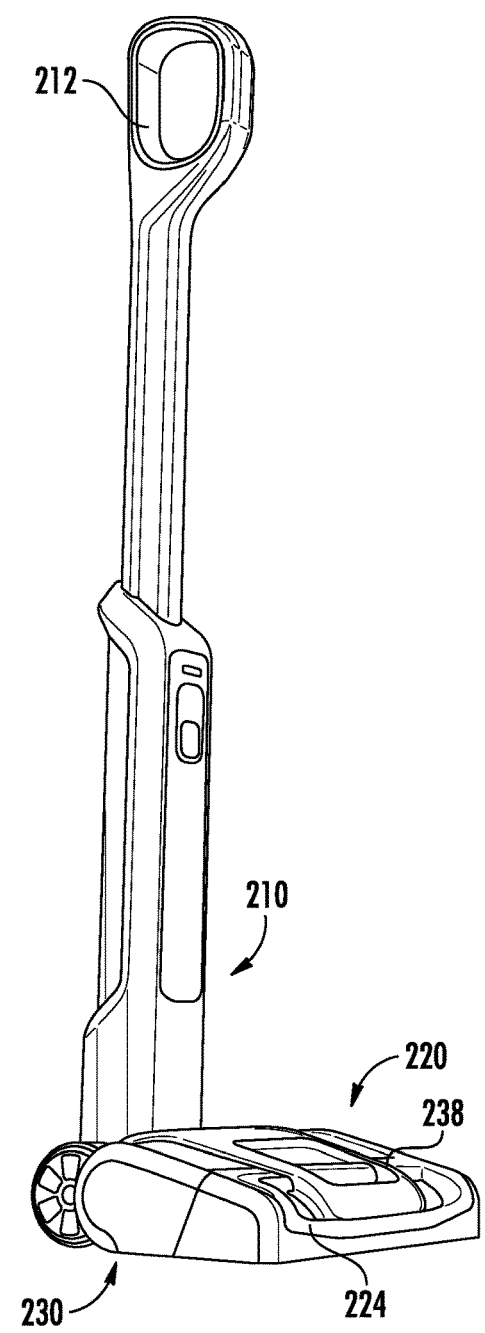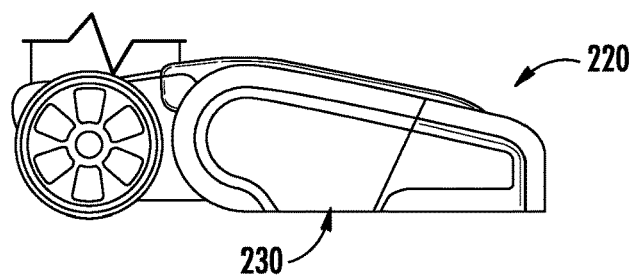
FIG. 3A
FIG. 3B
FIG. 3C

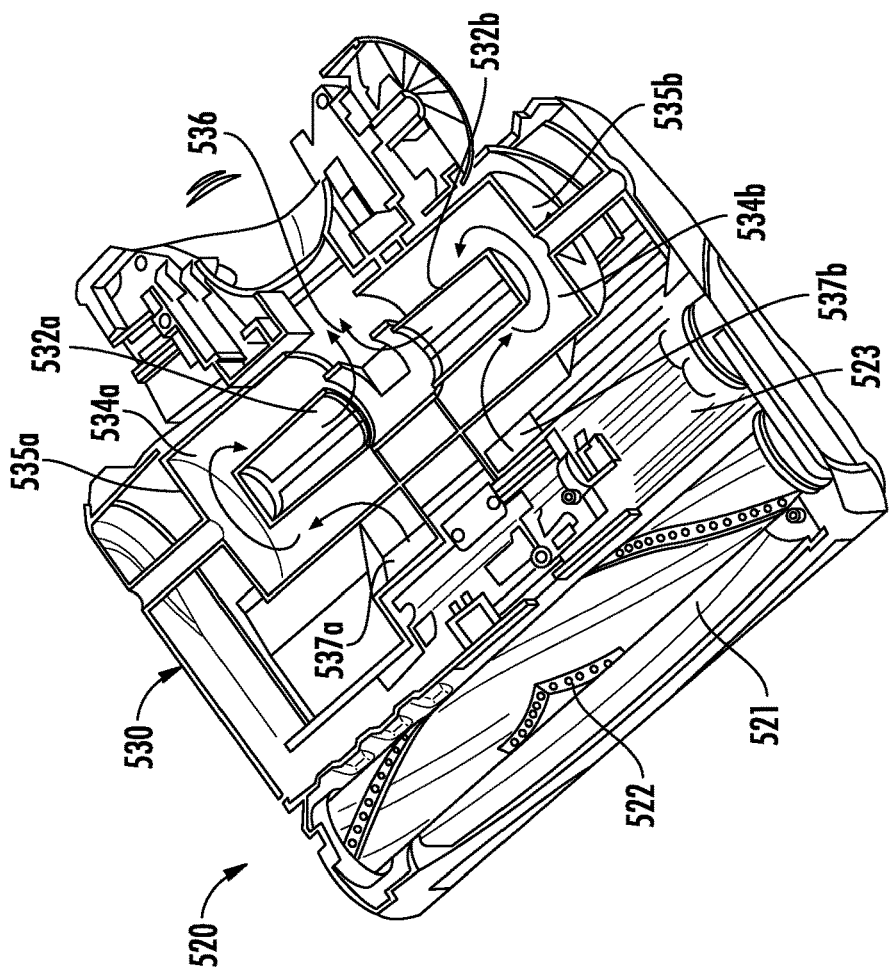
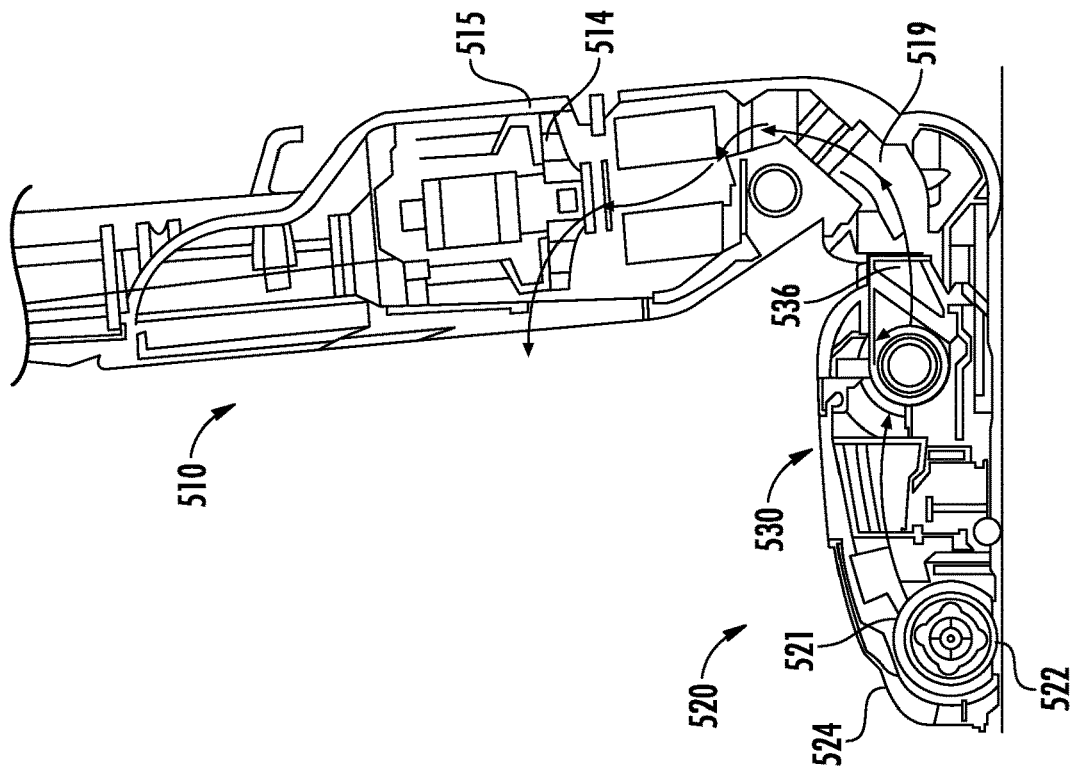

LOW PROFILE SURFACE CLEANING HEAD

CROSS-REFERENCE TO RELATED APPLICATIONS

The present application claims the benefit of U.S. Provisional Patent Application Ser. No. 62/202,004 filed on Aug. 6, 2015, which is fully incorporated herein by reference.

TECHNICAL FIELD

The present disclosure relates to vacuum cleaners and more particularly, to a low profile surface cleaning head for a vacuum cleaner or surface cleaning apparatus.

BACKGROUND INFORMATION

Existing all-in-the-head type vacuum cleaners generally include the functional or operational components (e.g., suction motor and cyclone) for the transport and treatment of air within the surface cleaning head. Accommodating these components within the surface cleaning head, however, often results in the profile being higher than desired for some cleaning applications (e.g., below a couch).

BRIEF DESCRIPTION OF THE DRAWINGS

These and other features and advantages will be better understood by reading the following detailed description, taken together with the drawings wherein:

FIGS. 3A and 3B are perspective views of a surface cleaning apparatus including the surface cleaning head shown in FIG. 2.

FIG. 3C is a side view of the surface cleaning head shown in FIGS. 3A and 3B.

FIG. 12 is a side cross-sectional view of the surface cleaning apparatus shown in FIG. 5 illustrating the air flow through the dual cyclone assembly and the suction motor.

FIG. 13 is a side cross-sectional view of the surface cleaning apparatus shown in FIG. 5 illustrating the air flow through the dual cyclone assembly in an air path to the suction motor.

DETAILED DESCRIPTION

Figure 1A:
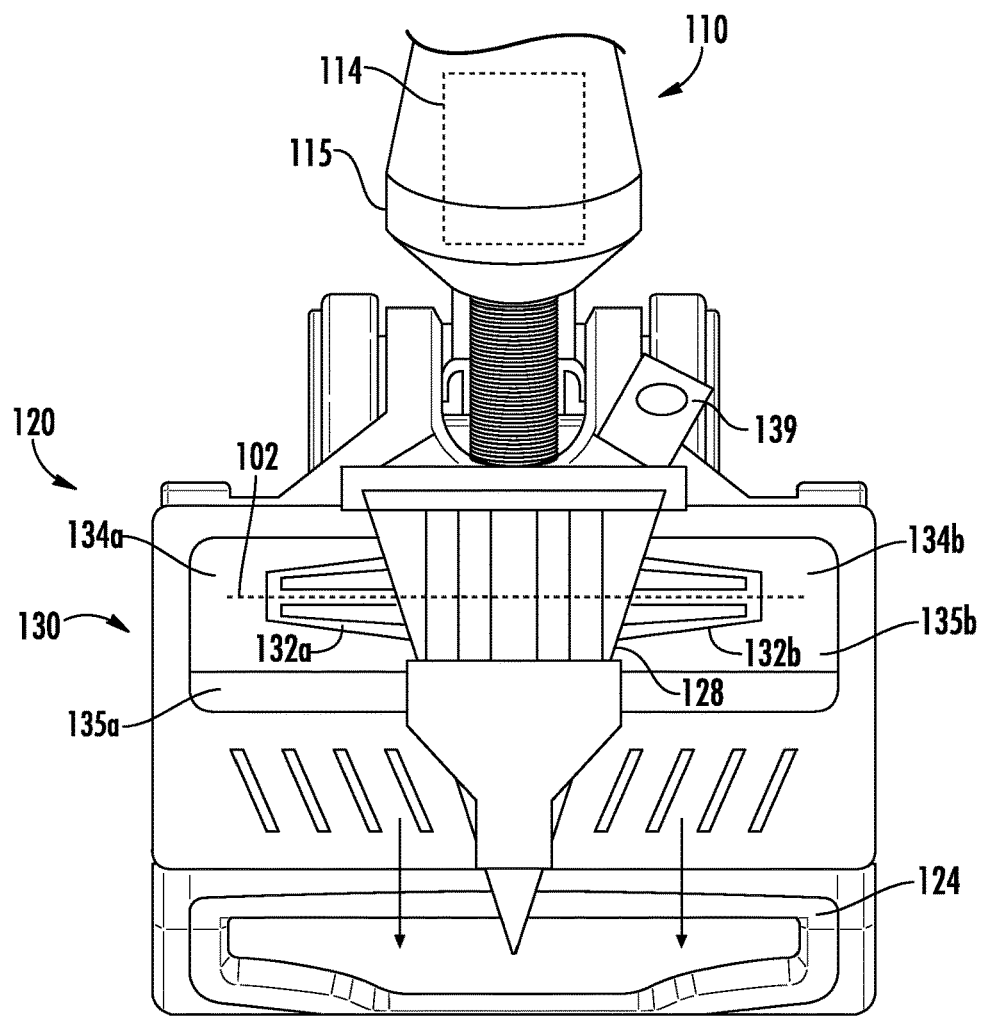
FIG. 1A is a top plan view of a surface cleaning head including a dual cyclone assembly, consistent with embodiments of the present disclosure.

A surface cleaning apparatus, consistent with embodiments of the present disclosure, provides a lower profile surface cleaning head by moving at least the suction motor out of the surface cleaning head. The suction motor may be located in an upper portion (e.g., in a wand) pivotably coupled to the surface cleaning head and fluidly connected to a cyclone assembly located in the surface cleaning head. The cyclone assembly may include first and second opposing cyclones with smaller diameters (e.g., as compared to a single cyclone used in existing "all in the head" vacuums) to provide a lower profile with substantially the same or better performance.

As used herein, "cyclone" refers to a structure that causes air to flow along a spiral path for purposes of causing particles in the air to be extracted. As used herein, "pivotably coupled" refers to a coupling or connection that allows pivoting in at least one direction and possibly multiple directions (e.g., forward and back and/or side to side).

Referring to FIGS. 1A-1E, a surface cleaning apparatus 100, consistent with one embodiment of the present disclosure, includes a wand or upper portion 110 and a surface cleaning head 120 pivotably connected to the upper portion 110. The upper portion 110 includes a handle (not shown in FIG. 1) and a suction motor 114 located in a motor housing section 115 of the upper portion 110. The surface cleaning apparatus 100 may include a battery 111 (FIG. 1B) to provide for cordless operation or may include a power cord for connecting to an external power source.

The surface cleaning head 120 includes a cyclone assembly 130 including first and second opposing cyclones 132a, 132b each located in an air path in fluid communication with the suction motor 114. The cyclones 132a, 132b each have a longitudinal axis oriented alone the same axis 102 and may have a diameter that is less than 4 inches and specifically about 3 inches in one embodiment. The cyclones 132a, 132b are located in first and second dirt collection chambers 134a, 134b defined by first and second dust cups 135a, 136b for collecting dirt from the air as it moves around the cyclones 132a, 132b and toward the suction motor 114. Providing two smaller diameter cyclones 132a, 132b and smaller dust cups allows the height h of the surface cleaning head 120 to be reduced, for example, to less than 90 mm and more specifically in a range of about 82 mm or less.

Figure 1B:
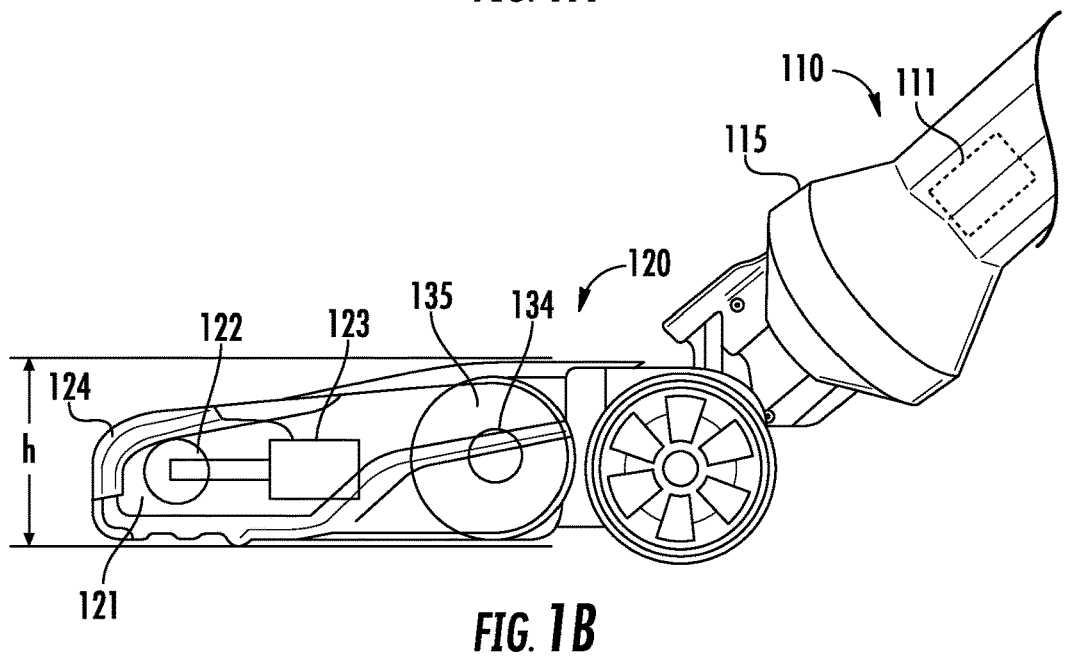
FIG. 1B is a side view of the surface cleaning head shown in FIG. 1A.

As shown in FIG. 1B, the surface cleaning head 120 further includes an agitator drive motor 123 drivingly connected to a driven agitator member 122. The driven agitator member 122 may include, for example, a rotating brush roll. The surface cleaning head 120 may further include an external cover 124 covering an agitator chamber 121 including the driven agitator member 122, which may be removable from the agitator chamber 121. One example of a surface cleaning head with an openable agitator chamber and a removable rotatable agitator is described in greater detail in U.S. Patent Application Publication No. 2016/0220080 (Ser. No. 14/739,915), which is incorporated herein by reference.

Figure 1C:
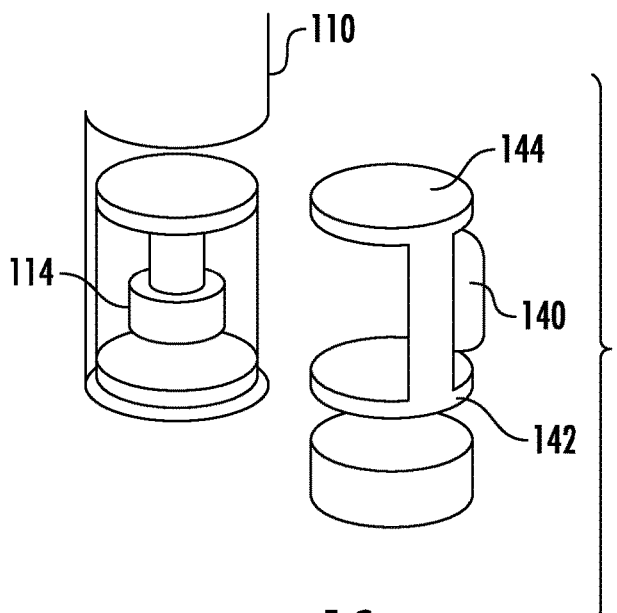
FIG. 1C is a schematic illustration of a filter assembly for a suction motor in the upper portion pivotably coupled to the surface cleaning head shown in FIG. 1A.

As shown in FIG. 1C, the upper portion 110 may also include a pre-motor filter 142 upstream of the suction motor 114 and/or a post-motor filter 144 downstream of the suction motor 114. The pre-motor filter 142 and the post motor filter 144 may be located in a dual filter frame 140 that fits around the motor 114. In this embodiment, the air path passes generally up and down through the filters 142, 144 and suction motor 114. In this embodiment, the filters 142, 144 and frame 140 have a generally cylindrical configuration.

Figure 1D:
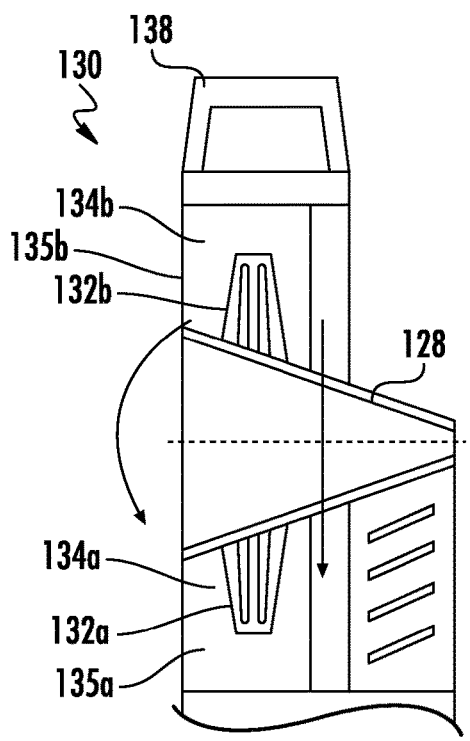
FIG. 1D is a top view of the dual cyclone assembly used in the surface cleaning head of FIG. 1A.
Figure 1E:
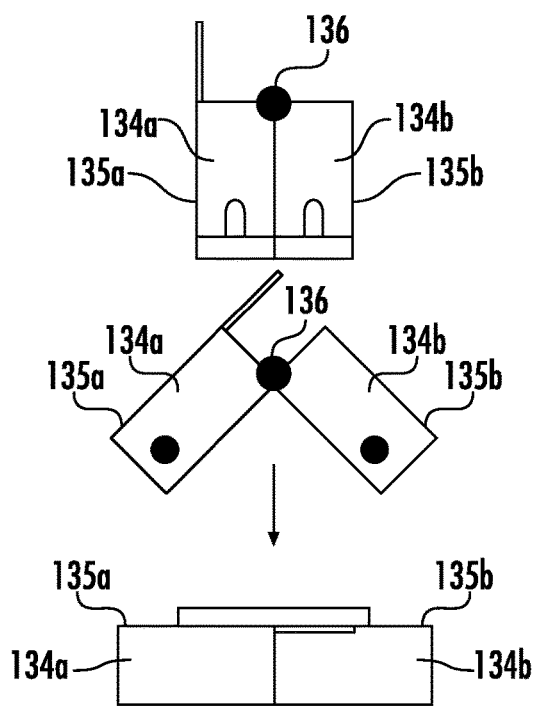
FIG. 1E is a schematic illustration of the opening of the dual cyclone assembly of FIG. 1D.

As shown in FIGS. 1D and 1E, the dust cups 135*a*, 135*b* containing the cyclones 132*a*, 132*b* may be removable from the surface cleaning head 120 and hingedly connected to each other at a location 136 between the cyclones. The dust cups 135*a*, 135*b* may also be spring loaded together to present when unlocked from the surface cleaning head 120. The cyclone assembly 130 may include one or more rollers configured to roll within one or more respective tracks located in the surface cleaning head 120. The surface cleaning head 120 may include a cyclone assembly release mechanism with a spring to lift up a middle portion of the cyclone assembly 130 when the release mechanism is actuated. The release mechanism may include a foot pedal 139 (FIG. 1A) for actuating the release mechanism. The cyclone assembly 130 may also include a handle 138 to remove the assembly 130 from the surface cleaning head 120. A wedge 128 may be used to separate the dust cups 135*a*, 135*b* when they are inserted into the surface cleaning head 120.

Referring to FIGS. 2A, 2B and 3A-3C, a surface cleaning apparatus 200, consistent with another embodiment, includes a surface cleaning head 220 with a cyclone assembly 230 having a handle 238 that engages an external cover 224 covering an agitator chamber 221 receiving a driven agitator member 222. The external cover 224 may be pivotable between a closed position and an open position to allow access to the agitator chamber 221 and agitator member 222 located therein. In this embodiment, the handle 238 may be used to hold the external cover 224 in the closed position. The driven agitator member 222 is driven by a drive motor 223 located in the surface cleaning head 220 and drivingly connected to the agitator member 222.

Similar to the embodiment described above, the surface cleaning apparatus 200 may include a suction motor and filters (not shown) in an upper portion 210. As shown in FIGS. 3A and 3B, the upper portion 210 is pivotably coupled to the surface cleaning head 220 at one end and includes a handle 212 at the other end. The surface cleaning apparatus 200 may include a battery to provide for cordless operation or may include a power cord for connecting to an external power source.

Figure 2A:
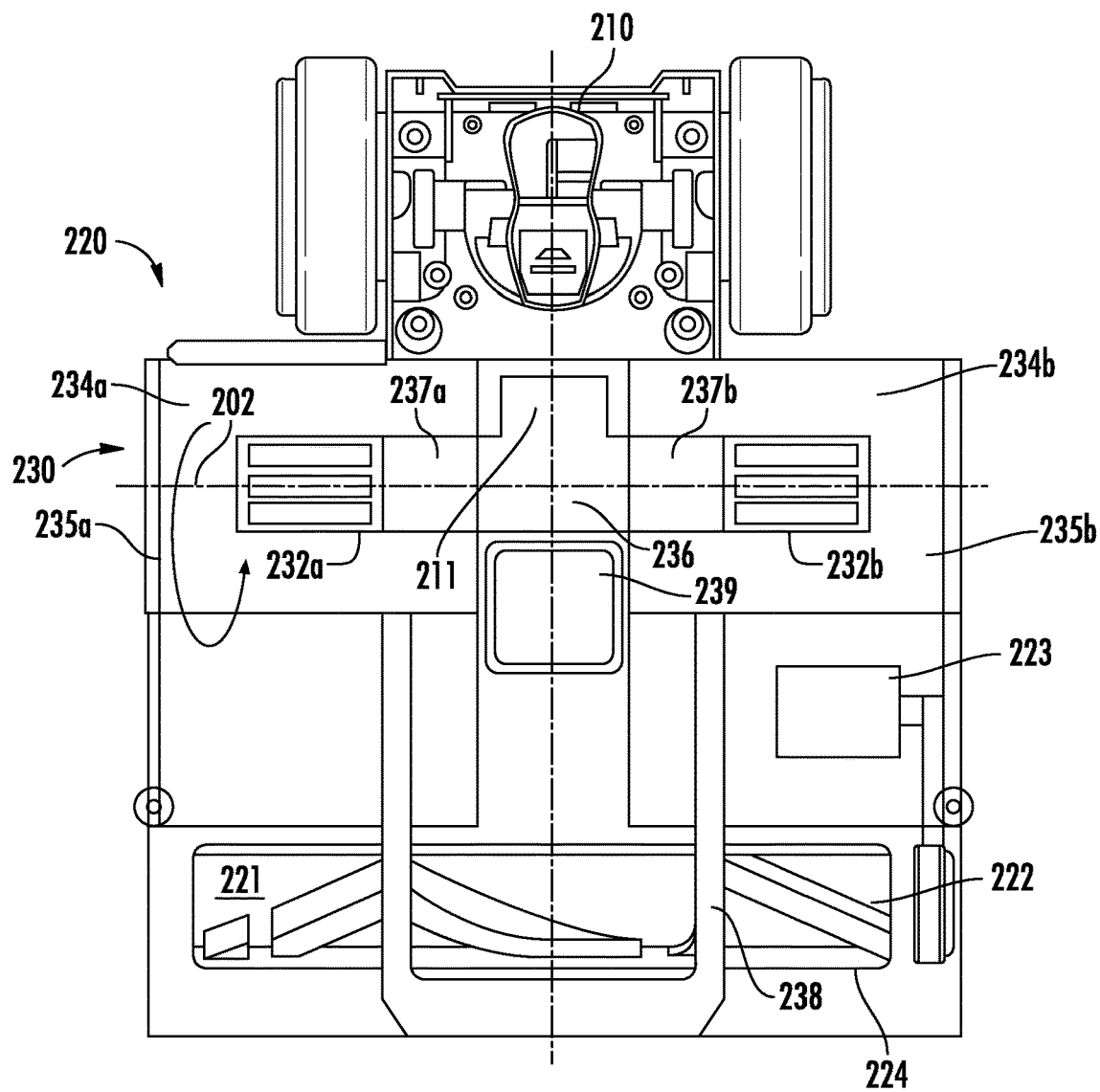
FIG. 2A is a top schematic view of a surface cleaning head including a dual cyclone assembly with a handle, consistent with another embodiment of the present disclosure.
Figure 2B:
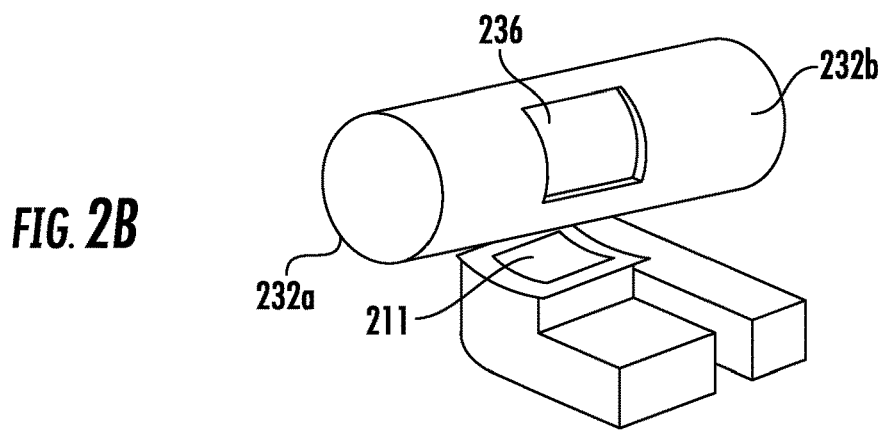
FIG. 2B is a perspective schematic view of a fluid coupling between an air path to a suction motor and the dual cyclone assembly in the surface cleaning head of FIG. 2A.

The cyclone assembly 230 in the surface cleaning head 220 includes first and second opposing cyclones 232*a*, 232*b* each located in an air path in fluid communication with the suction motor, for example, by way of air paths 237*a*, 237*b*. The cyclones 232*a*, 232*b* each have a longitudinal axis oriented alone the same axis 202 and may have a diameter that is less than 4 inches or less than 3½ inches and specifically about 3 inches in one embodiment. The cyclones 232*a*, 232*b* are located in first and second dirt collection chambers 234*a*, 234*b* defined by dust cups 235*a*, 235*b* for collecting debris from the air as it moves around the cyclones 232*a*, 232*b*, through the air paths 237*a*, 237*b* and toward the suction motor (not shown). As shown in FIG. 2B, a common dust cup outlet 236 from the air paths 237*a*, 237*b* may be fluidly coupled to an inlet 211 to an air path to the suction motor when the cyclone assembly 230 is positioned in the surface cleaning head 220. In this embodiment, the dirt collection chambers 234*a*, 234*b* may be opened from either end of the cyclone assembly 230 for emptying debris.

Figure 4C:
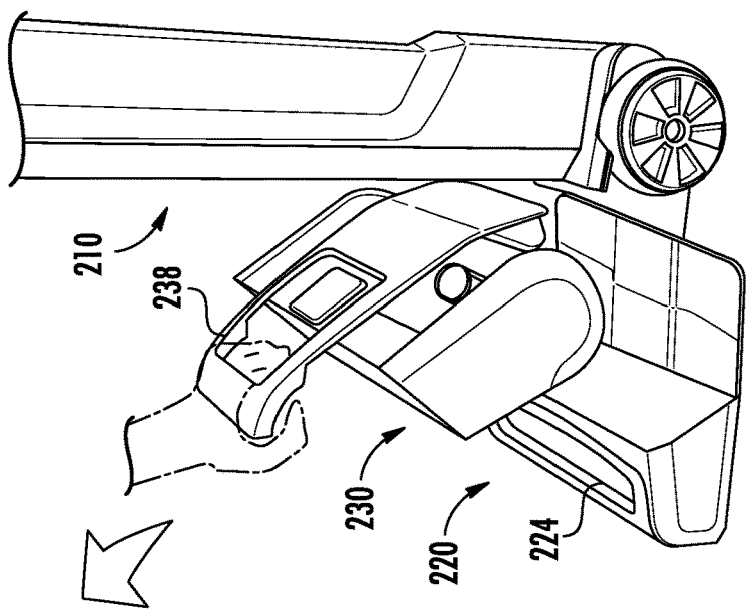
FIGS. 4A-4C are perspective views of the surface cleaning head shown in FIGS. 3A-3C illustrating removal of the cyclone assembly using the handle.
Figure 4B:
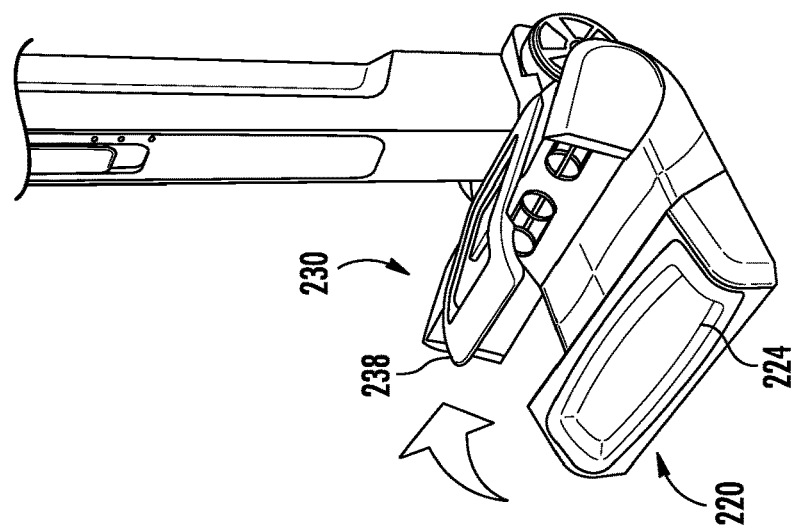
Figure 4A:
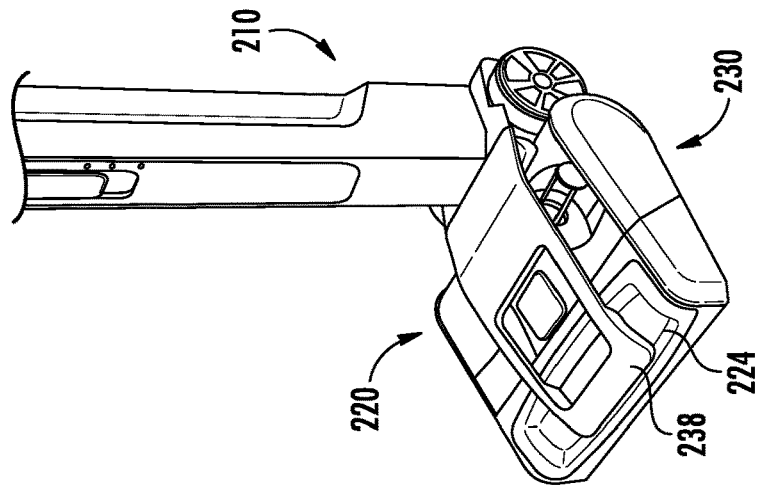
Figure 5:
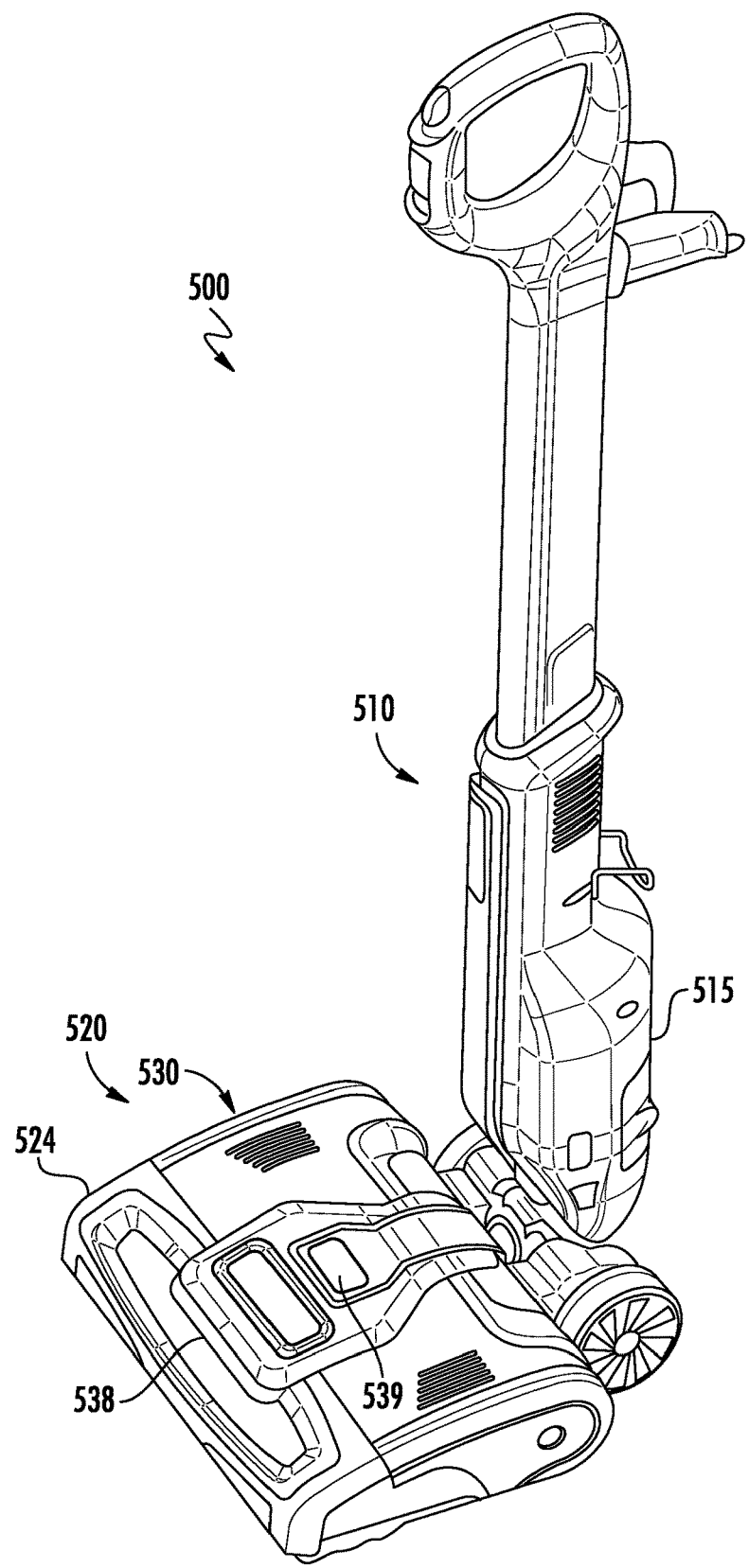
FIG. 5 is a perspective view of a surface cleaning apparatus including a surface cleaning head with a dual cyclone assembly, consistent with another embodiment of the present disclosure.
Figure 6:
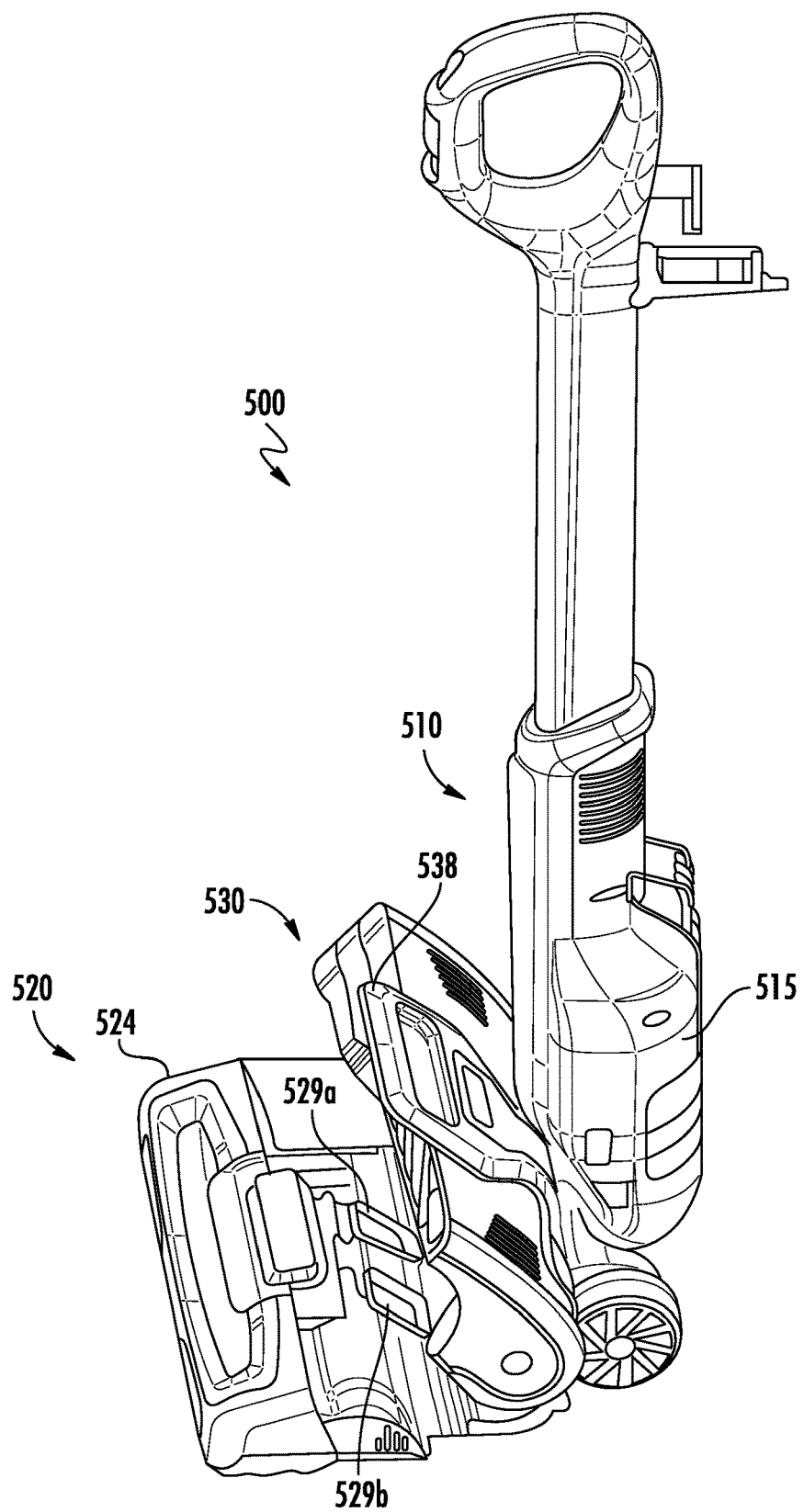
FIG. 6 is a perspective view the surface cleaning apparatus in FIG. 5 with the cyclone assembly in an open position for removal.
Figure 7:
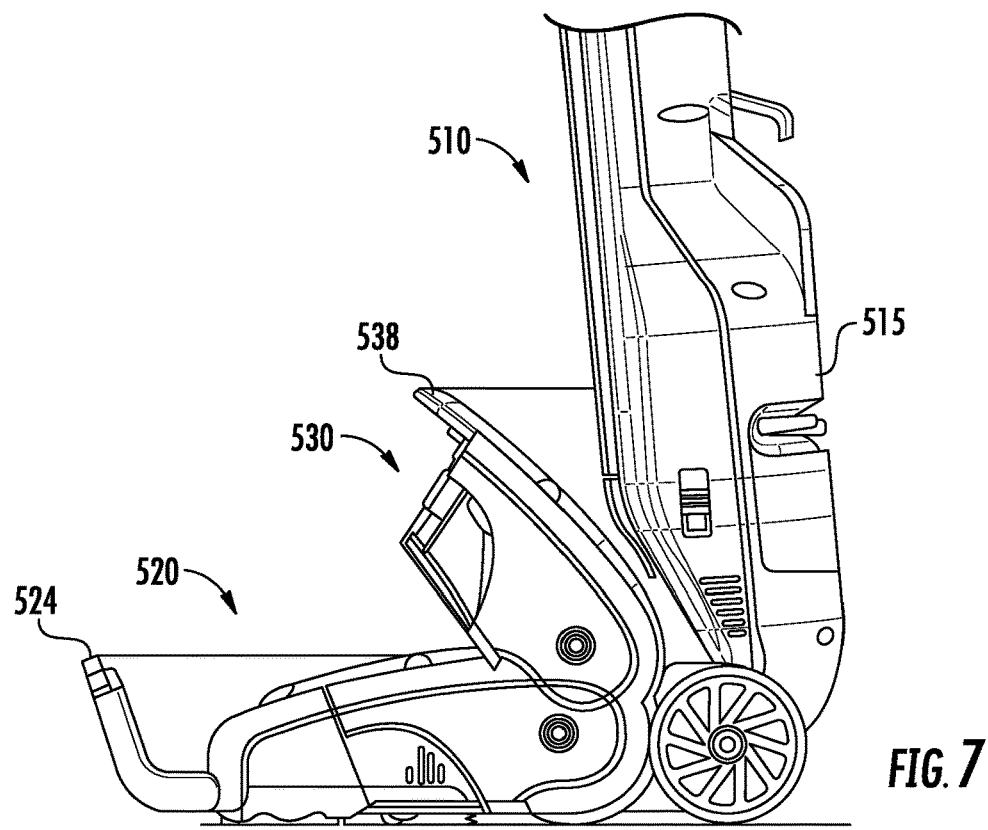
FIG. 7 is a side view of the surface cleaning head of the surface cleaning apparatus shown in FIG. 5 illustrating the open and closed positions of both the agitator chamber cover and the dual cyclone assembly.

The surface cleaning head 220 may include a foot pedal 239 for actuating a release mechanism that causes the cyclone assembly 230 to be released for removal. The release mechanism may include a latch for holding the cyclone assembly 130 and a spring for causing the cyclone assembly 130 to move when the latch is released. As shown in FIGS. 4A-4C, the cyclone assembly 230 pivots at one end when released such that the handle 238 may be grasped by a user for removing the cyclone assembly 230.

Referring to FIGS. 5-13, a further embodiment of a surface cleaning apparatus 500 is described and shown in greater detail. The surface cleaning apparatus 500 includes a wand or upper portion 510 pivotably coupled to a surface cleaning head 520 having a lower profile. The upper portion 510 includes a motor housing 515 containing a suction motor. The surface cleaning head 520 includes a dust cup and cyclone assembly 530 with dual opposing cyclones. The dust cup and cyclone assembly 530 pivots from a closed position (FIG. 5) to an open position (FIG. 6) for removal. In the closed position, the dust cup and cyclone assembly 530 is fluidly coupled between a dirty air inlet and agitator chamber in the surface cleaning head 520 and the suction motor in the motor housing 515.

As shown in FIGS. 12 and 13, the surface cleaning head 520 includes an agitator 522, such as a rotating brush roll, located in an agitator chamber 521, which is covered by an agitator chamber cover 524. A motor 523 is located in the surface cleaning head 520 for rotating the agitator 522.

Figure 8:
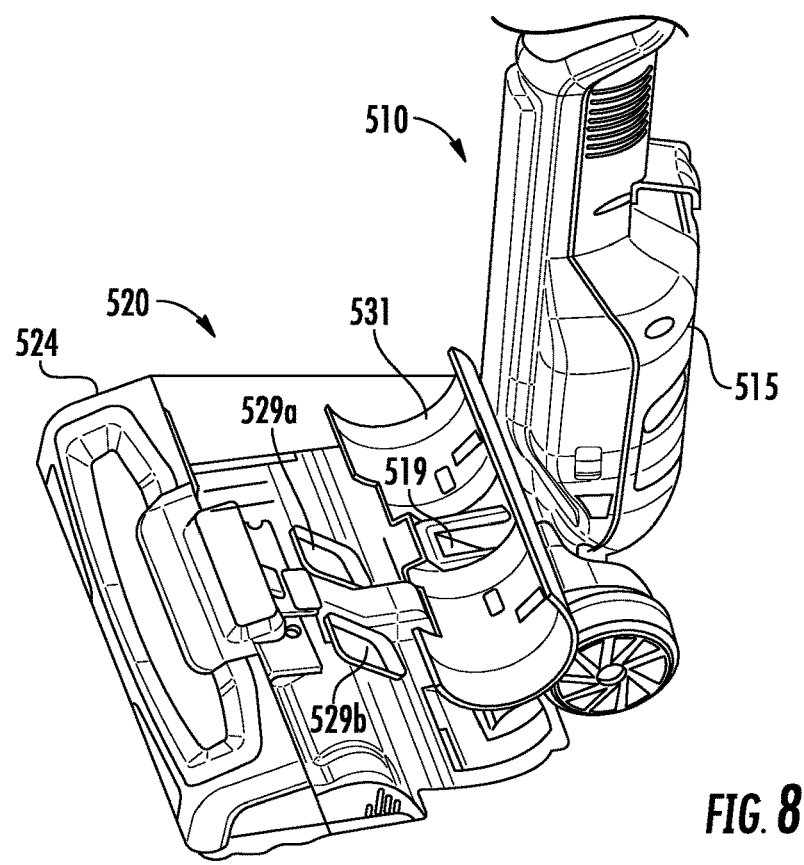
FIG. 8 is a perspective view of the surface cleaning head of the surface cleaning apparatus shown in FIG. 5 with the dual cyclone assembly removed.

The dust cup and cyclone assembly 530 includes a handle 538 that engages and may secure the agitator chamber cover 524 in a closed position. Thus, the dust cup and cyclone assembly 530 is moved to an open position to allow the agitator chamber cover 524 to be moved to an open position (FIG. 7) for access to the agitator 522 (e.g., a removable brush roll). The dust cup and cyclone assembly 530 is seated in a pivoting dust cup base 531 to allow the dust cup and cyclone assembly 530 to be removed (FIG. 8). When positioned in the dust cup base 531 and moved to the closed position, the dust cup and cyclone assembly 530 is fluidly coupled to first and second agitator chamber outlets 529*a*, 529*b* and a wand air path inlet 519 leading to the air path through the upper portion 510.

Figure 9:
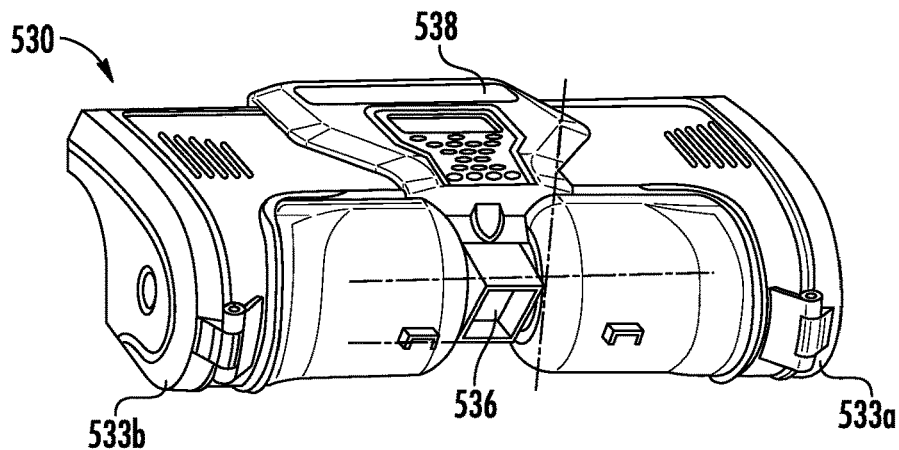
FIG. 9 is a top perspective view of the dual cyclone assembly for use in the surface cleaning apparatus shown in FIG. 5.
Figure 10:
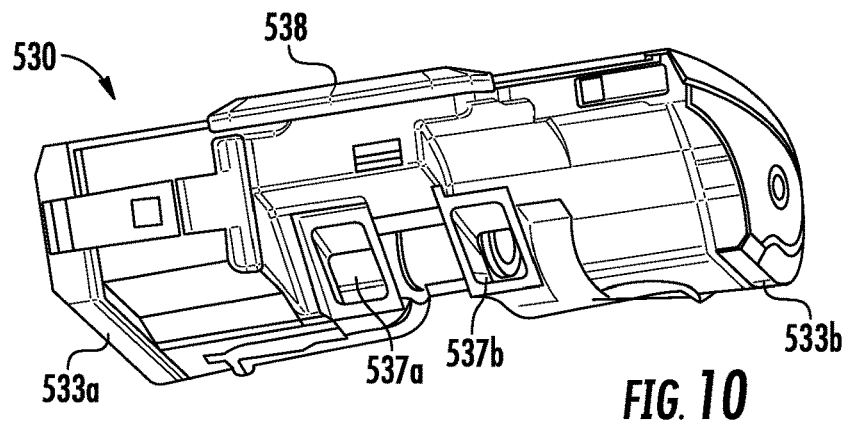
FIG. 10 is a bottom perspective view of the dual cyclone assembly for use in the surface cleaning apparatus shown in FIG. 5.
Figure 11:
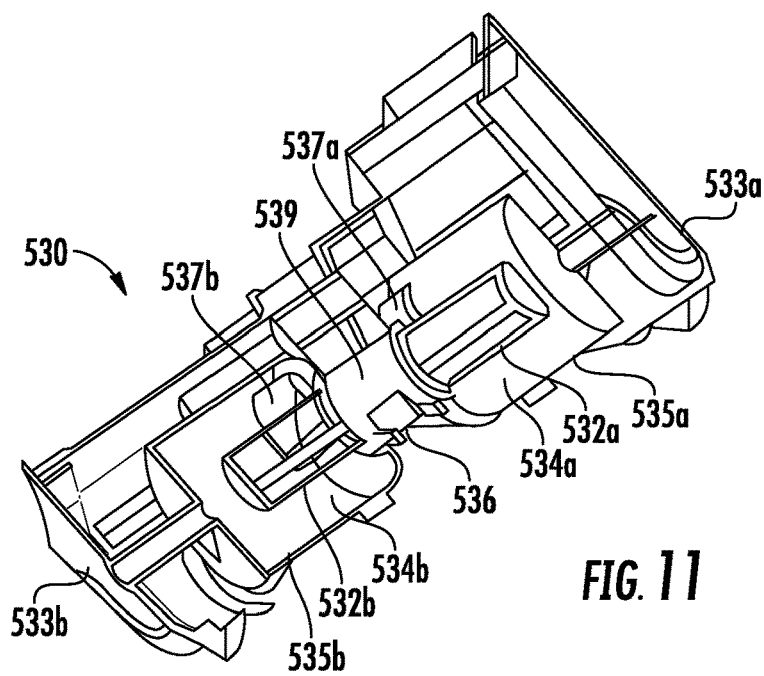
FIG. 11 is a cross-sectional view of the dual cyclone assembly shown in FIG. 10.

FIGS. 9-11 show the dust cup and cyclone assembly 530 in greater detail. As shown, the dust cup and cyclone assembly 530 includes first and second cyclones 532*a*, 532*b* located in first and second dirt collection chambers 534*a*, 534*b* defined by first and second dust cups 535*a*, 535*b*. First and second dust cup covers 531*a*, 531*b* are pivotably coupled to the respective dust cups 535*a*, 535*b* and may be held closed by releasable latches. The dust cup and cyclone assembly 530 includes first and second dust cup inlets 537*a*, 537*b* to the respective first and second dirt collection chambers 534*a*, 534*b* and a dust cup outlet 536 from a region 539 fluidly coupled to both dirt collection chambers 534a, 534b. When the dust cup and cyclone assembly 530 is in the closed position in the surface cleaning head 520, the first and second dust cup inlets 537a, 537b fluidly couple to the respective agitator chamber outlets 529a, 529b shown in FIG. 8 and the dust cup outlet 536 fluidly couples to the wand air path inlet 519 shown in FIG. 8. As shown in FIGS. 12 and 13, a suction motor 514 in the wand or upper portion 510 causes air to be drawn from an agitator chamber 521, through the dust cup inlets 537a, 537b, around the cyclones 532a, 532b, through the dust cup outlet 536, into a wand air path 511, and out of an exhaust 519.

Although specific embodiments of the dual cyclone assembly are shown and described herein, the surface cleaning head may include other configurations.

Figure 14:
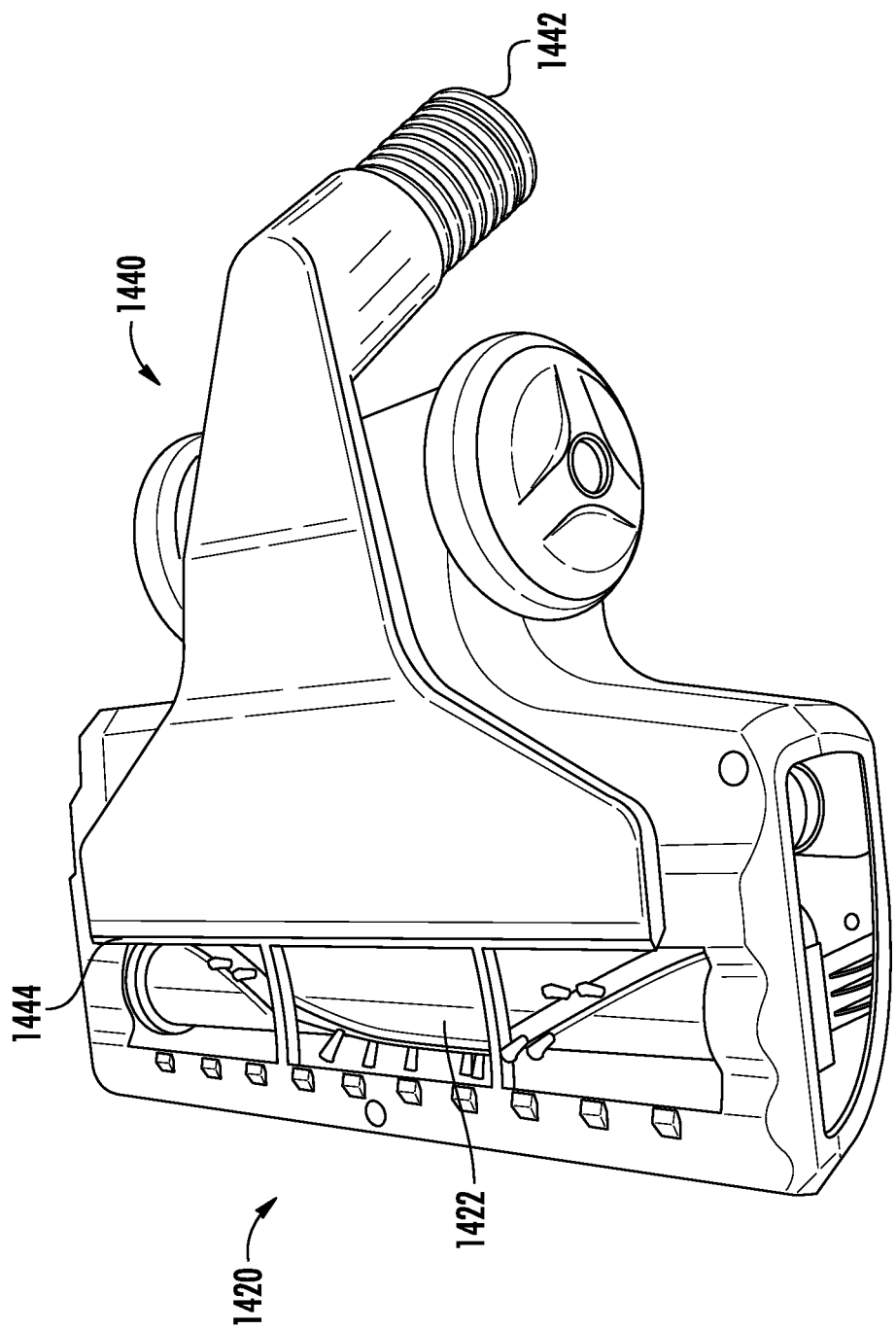
FIG. 14 is a bottom view of a surface cleaning head with a conduit for blasting a cleaning surface with exhausted air.

Referring to FIG. 14, any of the embodiments of the surface cleaning apparatus described above may further include a conduit 1440 having an inlet 1442 coupled to an exhaust of the suction motor (e.g., suction motor 114 shown in FIG. 1A) and an elongated outlet 1444 coupled to a lower portion of a surface cleaning head 1420 adjacent the driven agitator member 1422. The elongated outlet 1444 may extend substantially the length of the bottom inlet opening 1421 of the surface cleaning head 1420. The conduit 1440 blasts a cleaning surface with exhausted air to improve cleaning. The elongated outlet 1444 may be located rearward of the agitator member 1422 and the air may be directed at an angle (e.g., an angle of about 45°) relative to the cleaning surface. This air blast may thus agitate dust and debris that might be stuck and/or located in a dead zone. A valve (not shown in FIG. 14), such as a sliding plate, may be used to redirect air from adjacent the agitator member 1422 to a front corner of the surface cleaning head 1420.

Accordingly, a surface cleaning apparatus, consistent with embodiments of the present disclosure, is configured to have a surface cleaning head with a lower profile by using dual cyclones having smaller diameters and by locating the suction motor in the wand or upper portion coupled to the surface cleaning head.

Consistent with one embodiment, a surface cleaning apparatus includes an upper portion including a handle and a suction motor and a surface cleaning head pivotably connected to the upper portion. The surface cleaning head includes an agitator drive motor drivingly connected to a driven agitator member and a cyclone assembly including first and second opposing cyclones each in an air path in fluid communication with the suction motor.

Consistent with another embodiment, a surface cleaning apparatus includes an upper portion including a handle and a suction motor and a surface cleaning head pivotably connected to the upper portion. The surface cleaning head includes an agitator drive motor drivingly connected to a driven agitator member and a cyclone assembly including first and second opposing cyclones each in an air path in fluid communication with the suction motor. The cyclone assembly is removable from the surface cleaning head and hingedly connected at a location between the cyclones.

Consistent with a further embodiment, surface cleaning apparatus includes an upper portion including a handle and a suction motor and a surface cleaning head pivotably connected to the upper portion. The surface cleaning head includes an agitator chamber including a driven agitator member, an external cover covering the agitator chamber, a drive motor drivingly connected to the driven agitator member, and a cyclone assembly including first and second opposing cyclones each in an air path in fluid communication with the suction motor. The cyclone assembly includes a handle for removing the cyclone assembly, and the handle is configured to engage the external cover covering the agitator chamber.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. A surface cleaning apparatus, comprising:
   a surface cleaning head configured to be pivotably connected to an upper portion of said surface cleaning apparatus, the surface cleaning head including:
   an agitator drive motor drivingly connected to a driven agitator member; and
   a cyclone assembly including first and second opposing cyclones each configured to be in an air path in fluid communication with a suction motor, wherein the first and second opposing cyclones are hingedly coupled to each other at a location between the cyclones and are configured to be removable from the surface cleaning head as a single unit.

2. The surface cleaning apparatus of claim 1, wherein the first and second cyclones each have a longitudinal axis which are oriented substantially along the same axis.

3. The surface cleaning apparatus of claim 1, wherein the cyclone assembly further includes first and second dirt collection chambers respectively containing the first and second cyclones.

4. The surface cleaning apparatus of claim 1, further comprising an upper portion including a handle and a suction motor, wherein the upper portion further includes a pre-motor filter upstream of the suction motor.

5. The surface cleaning apparatus of claim 1, further comprising an upper portion including a handle and a suction motor, wherein the upper portion further includes a post-motor filter downstream of the suction motor.

6. The surface cleaning apparatus of claim 1, further including a cyclone assembly release mechanism including a spring to lift up a middle portion of the cyclone assembly when the release mechanism is actuated.

7. The surface cleaning apparatus of claim 6, wherein the dual cyclones fold about a hinge when the release mechanism is actuated.

8. The surface cleaning apparatus of claim 7, wherein the cyclone assembly further includes a handle to remove the cyclone assembly from the surface cleaning head.

9. The surface cleaning apparatus of claim 8, wherein the surface cleaning head includes a wedge to separate the dual cyclones when they are reinserted into the surface cleaning head.

10. The surface cleaning apparatus of claim 9, wherein the release mechanism including a foot pedal for actuating the release mechanism.

11. The surface cleaning apparatus of claim 1, wherein each cyclone is less than 4 inches in diameter.

12. The surface cleaning apparatus of claim 1 further including a battery for powering the suction motor and the agitator drive motor to provide cordless operation.

13. A surface cleaning apparatus, comprising:
   an upper portion including a handle and a suction motor;
   a surface cleaning head pivotably connected to the upper portion, the surface cleaning head including:

an agitator drive motor drivingly connected to a driven agitator member; and a cyclone assembly including first and second opposing cyclones each in an air path in fluid communication with the suction motor, wherein the cyclone assembly is removable from the surface cleaning head and hingedly connected at a location between the cyclones.

14. The surface cleaning apparatus of claim 13, wherein the suction motor is mounted within the upper portion.

15. The surface cleaning apparatus of claim 13, further including a conduit having an inlet coupled to the exhaust of the suction motor and an elongated outlet coupled to a lower portion of the surface cleaning head adjacent the driven agitator member, the conduit configured to blast a cleaning surface with air to improve cleaning.

16. The surface cleaning apparatus of claim 13 further including a battery for powering the suction motor and the agitator drive motor to provide cordless operation.

17. A surface cleaning apparatus, comprising:
an upper portion including a handle and a suction motor;
a surface cleaning head pivotably connected to the upper portion, the surface cleaning head including:
an agitator chamber including a driven agitator member;
an external cover configured to removably cover the agitator chamber;
a drive motor drivingly connected to the driven agitator member; and
a cyclone assembly including first and second opposing cyclones each in an air path in fluid communication with the suction motor, the cyclone assembly including a handle for removing the cyclone assembly, the handle being configured to engage the external cover covering the agitator chamber and hold the external cover in a closed position over the agitator chamber.

18. The surface cleaning apparatus of claim 17 wherein the external cover is pivotable between the closed position and an open position.

19. The surface cleaning apparatus of claim 17 wherein the first and second cyclones each have a longitudinal axis which are oriented substantially along the same axis.

20. The surface cleaning apparatus of claim 17 further comprising a cyclone assembly release mechanism for releasing the cyclone assembly from the surface cleaning head.

* * * * *